(12) United States Patent
Bétrisey et al.

(10) Patent No.: US 12,161,248 B2
(45) Date of Patent: Dec. 10, 2024

(54) DEVICE FOR FEEDING COFFEE POWDER INTO A BREWING CHAMBER OF A COFFEE MACHINE

(71) Applicant: EVERSYS HOLDING SA, Ardon (CH)

(72) Inventors: Stéphane Bétrisey, Charrat (CH); Grégoire Locher, Daillon (CH)

(73) Assignee: Eversys S.A., Sierre (CH)

( * ) Notice: Subject to any disclaimer, the term of this patent is extended or adjusted under 35 U.S.C. 154(b) by 748 days.

(21) Appl. No.: 17/414,796

(22) PCT Filed: Oct. 23, 2019

(86) PCT No.: PCT/EP2019/078812
§ 371 (c)(1),
(2) Date: Jun. 16, 2021

(87) PCT Pub. No.: WO2020/126164
PCT Pub. Date: Jun. 25, 2020

(65) Prior Publication Data
US 2022/0192412 A1 Jun. 23, 2022

(30) Foreign Application Priority Data
Dec. 21, 2018 (DE) .................. 20 2018 107 372.9

(51) Int. Cl.
*A47J 31/42* (2006.01)
*A47J 31/06* (2006.01)
(Continued)

(52) U.S. Cl.
CPC ....... *A47J 31/0663* (2013.01); *A47J 31/3609* (2013.01); *A47J 31/404* (2013.01); *A47J 31/42* (2013.01); *A47J 31/52* (2013.01)

(58) Field of Classification Search
CPC ........... A47J 31/404; A47J 31/42; A47J 31/40
(Continued)

(56) References Cited

U.S. PATENT DOCUMENTS

| | | | |
|---|---|---|---|
| 4,957,753 A | 9/1990 | Bardsley et al. | |
| 4,983,412 A * | 1/1991 | Hauslein ............. | A47J 31/0631 426/433 |

(Continued)

FOREIGN PATENT DOCUMENTS

| | | |
|---|---|---|
| AT | 338989 | 9/1977 |
| CN | 205168947 U | 4/2016 |

(Continued)

OTHER PUBLICATIONS

Supplemental Search Report received in Chinese Application No. 2019800837924, Dec. 1, 2023, 8 pages.
(Continued)

*Primary Examiner* — Reginald Alexander
(74) *Attorney, Agent, or Firm* — CM Law PLLC

(57) ABSTRACT

The invention relates to a device for feeding coffee powder (a) into a brewing chamber of a coffee machine, comprising a brewing chamber container (1) having a filling opening (2) for receiving and brewing the coffee powder (a) and a feeding apparatus (3) for feeding the coffee powder (a) into the brewing chamber container (1) through the filling opening (2). By means of a shaking apparatus (4), which is coupled to the brewing chamber container (1), the brewing chamber container (1) is set vibrating during and/or after the filling with coffee powder. As a result, the coffee powder put into the brewing chamber container is compressed and evened out and, in particular, the coffee powder is prevented from piling up in the form of hills as the coffee powder is put into the brewing chamber container.

19 Claims, 2 Drawing Sheets

Figure 1:
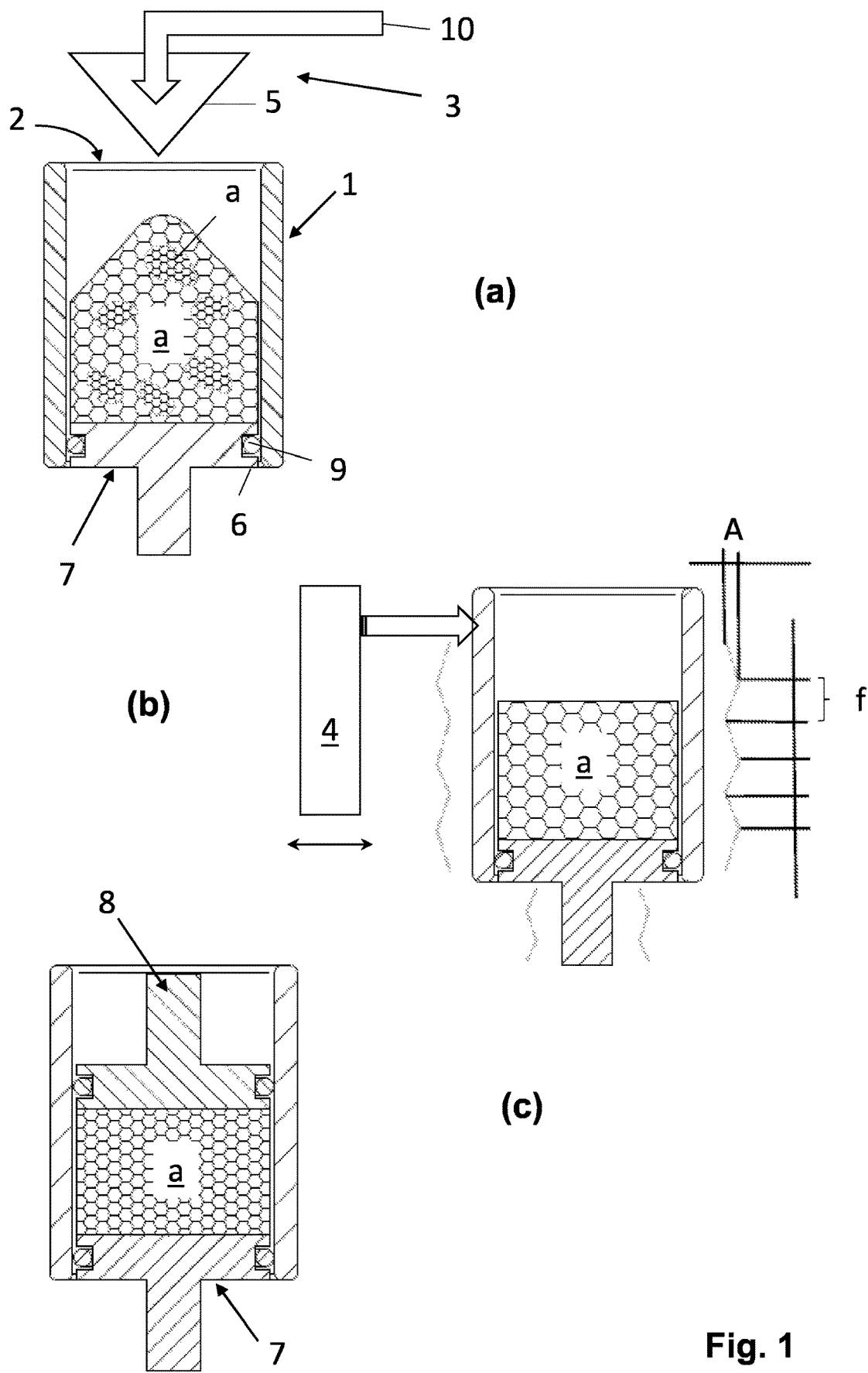

(51) Int. Cl.
*A47J 31/36* (2006.01)
*A47J 31/40* (2006.01)
*A47J 31/52* (2006.01)

(58) Field of Classification Search
USPC .................................................. 99/286, 287
See application file for complete search history.

(56) References Cited

U.S. PATENT DOCUMENTS

| | | | | |
|---|---|---|---|---|
| 5,237,911 | A * | 8/1993 | Aebi | A47J 31/4421 |
| | | | | 99/287 |
| 5,259,296 | A | 11/1993 | Mikael et al. | |
| 5,285,705 | A * | 2/1994 | Buttle | A47J 42/40 |
| | | | | 99/289 R |
| 5,358,725 | A * | 10/1994 | Izumitani | A23F 5/26 |
| | | | | 99/290 |
| 6,227,102 | B1 * | 5/2001 | Sham | A47J 31/42 |
| | | | | 99/287 |
| 7,013,795 | B2 * | 3/2006 | Mulle | A47J 31/42 |
| | | | | 99/290 |
| 7,063,005 | B1 * | 6/2006 | Sit | A47J 31/42 |
| | | | | 99/289 R |
| 2015/0223629 | A1 * | 8/2015 | Marchi | A47J 31/405 |
| | | | | 99/287 |
| 2018/0332996 | A1 | 11/2018 | Lee | |
| 2021/0235918 | A1 * | 8/2021 | Chen | A23F 5/26 |

FOREIGN PATENT DOCUMENTS

| | | |
|---|---|---|
| CN | 205221153 U | 5/2016 |
| CN | 106238194 A | 12/2016 |
| DE | 3529544 A1 | 1/1986 |
| DE | 3643879 C1 | 10/1987 |
| DE | 102012016560 A1 | 2/2013 |
| DE | 202016000769 U1 | 6/2017 |
| DE | 102016112092 A1 | 1/2018 |
| JP | H11120434 A | 4/1999 |
| JP | 2015518381 A | 7/2015 |
| KR | 101457189 B1 | 10/2014 |

OTHER PUBLICATIONS

Third Examination Opinion received in Chinese Application No. 2019800837924, Dec. 7, 2023, 20 pages.
Office Action (and English translation) received in Japanese Application No. 2021-535047, dated Feb. 6, 2024, 4 pages.

* cited by examiner

DEVICE FOR FEEDING COFFEE POWDER INTO A BREWING CHAMBER OF A COFFEE MACHINE

The invention relates to a device for feeding coffee powder into a brewing chamber of a coffee machine according to the preamble of claim 1.

The quality of coffee beverages produced in fully automatic or semi-automatic coffee machines by brewing coffee powder with hot water substantially depends on, inter alia, the distribution, the homogeneity and the density of the coffee powder introduced into a brewing chamber of the coffee machine, as well as many other parameters. The coffee powder is produced in fully automatic or semi-automatic coffee machines either by an integrated grinding device or is provided in a storage container for already pre-ground coffee powder and transported into the brewing chamber in portions during the production of a coffee beverage, compressed therein if appropriate, and brewed with hot water to produce the coffee beverage.

When the coffee powder ground in a grinding device of the coffee machine or provided in the storage container is fed into the brewing chamber, the problem arises that, when the coffee powder is introduced into a brewing chamber container, there is no even leveling of the coffee powder introduced into the brewing chamber container. Due to gravity, the coffee powder falls from above through a filling opening into the brewing chamber container and forms an unevenly shaped heap of coffee powder in the form of a hill there. In particular when espresso is produced, the coffee powder in the brewing chamber container is compressed by mechanical pressure, wherein the pressure is applied either manually outside the coffee machine by a barista using a tamper or automatically inside the coffee machine by a tamper being pressed from above through the filling opening into the brewing chamber container to compress the coffee powder. The pressure applied in the process likewise has a considerable influence on the quality of the coffee beverage produced. Due to the accumulation of the coffee powder in the form of a hill during introduction into the brewing chamber container, an uneven distribution of the coffee powder in the brewing chamber container and, when the coffee powder is pressed, an inhomogeneous density distribution of the coffee powder compressed in the brewing chamber container are resulting. This has adverse effects on the quality of the coffee beverage produced.

In order to overcome this problem, apparatuses for introducing and distributing coffee powder into brewing chamber containers of coffee machines have been proposed in the prior art, with which an evenly filling of the brewing chamber container is made possible. For example, EP 3 400 853 A1 discloses a device for introducing and evenly distributing coffee powder into a portafilter container of an espresso machine, the device comprising a rotor which is rotatably mounted in the portafilter container and has rotor blades arranged thereon. The rotor blades are inclined in relation to the rotational axis of the rotor. During the introduction of coffee powder into the portafilter container, the rotor is caused to rotate, as a result of which the rotor moves upward and the introduced amount of coffee powder is mixed evenly.

However, this device known from the prior art for introducing and distributing coffee powder into a brewing chamber container of a coffee machine proves to be disadvantageous because the amount of coffee powder introduced into the brewing chamber container cannot be compressed by a tamper, which can be inserted from above into the filling opening of the brewing chamber container, because a lid is arranged in the region of the filling opening on the portafilter container, in which the rotor is rotatably mounted. The coffee powder introduced into the portafilter container by means of the device known from the prior art therefore cannot be compressed automatically through inside the coffee machine by using an integrated tamper in the brewing chamber container.

Proceeding therefrom, the invention is based on the object of providing a device for feeding coffee powder into a brewing chamber of a coffee machine, which device on the one hand allows the coffee powder to be distributed as evenly and homogeneously as possible in a brewing chamber container of the brewing chamber and on the other hand allows the introduced coffee powder to be compressed by the action of a tamper integrated in the coffee machine.

This object is achieved with a device for feeding coffee powder into a brewing chamber of a coffee machine, having the features of claim 1. Preferred embodiments of the device are disclosed in the dependent claims.

The device according to the invention comprises a brewing chamber container with a filling opening and a feeding apparatus for feeding the coffee powder through the filling opening into the brewing chamber container, which is used for receiving and brewing the coffee powder. In order to even out the coffee powder introduced into the brewing chamber container by means of the feeding apparatus, the device according to the invention furthermore has a shaking apparatus which is coupled to the brewing chamber container in order to cause it to vibrate while the coffee powder is fed or after the coffee powder has been fed from the feeding apparatus into the brewing chamber container.

The shaking apparatus coupled to the brewing chamber container causes the brewing chamber container to vibrate during the introduction of the coffee powder into the brewing chamber container or after completion of the filling process. Due to the vibration of the brewing chamber container, the amount of coffee powder introduced thereinto is distributed evenly in the brewing chamber container during or after the filling process, without a heap of coffee powder in the form of a hill being able to form in the brewing chamber container. After completion of the introduction of the coffee powder into the brewing chamber container and the evening out of the distribution of the introduced coffee powder, the shaking apparatus can be switched off, and the introduced amount of coffee powder can be compressed with a tamper which is pressed into the brewing chamber container through the filling opening. The tamper is expediently an integral component of the coffee machine so that the introduced coffee powder can be compressed in an automated manner within the coffee machine.

In order to ensure that the entire amount of coffee powder transported from the feeding apparatus to the brewing chamber enters the brewing chamber container, it is expedient to equip the feeding apparatus with a feeding element decoupled from the brewing chamber container. The coffee powder can thereby be conducted largely without loss from the feeding apparatus into the brewing chamber container of the brewing chamber. The feeding element can be, for example, a funnel or a filling tube. The feeding element is expediently arranged above the filling opening of the brewing chamber container so that the coffee powder can fall from a discharge opening of the feeding element into the brewing chamber container due to gravity. The feeding element is advantageously decoupled from the brewing chamber container. This ensures that, during operation of the shaking apparatus, only the brewing chamber container coupled thereto is caused to vibrate but not the feeding element. An unimpeded discharge of the coffee powder from the discharge opening of the feeding element into the brewing chamber container can thereby be ensured without vibrations interfering with the discharge of the coffee powder.

The brewing chamber container can expediently be a cylindrical container which is integrated into the coffee machine as a component of a brewing chamber. Such a brewing chamber container integrated into a fully automatic coffee machine comprises, for example, a tubular main body with a filling opening arranged at the top and an outlet opening opposite thereto. A movable first tamper is inserted into the outlet opening and, in its inserted position, forms a bottom in the brewing chamber container. A further tamper can be inserted from above through the filling opening. In order to fill the brewing chamber container thus formed with coffee powder and during brewing of the coffee powder to produce a coffee beverage, the first tamper is in its inserted position and forms the bottom of the brewing chamber container on which the introduced amount of coffee powder rests. After the desired amount of coffee powder has been introduced, the further tamper can be pressed through the filling opening into the brewing chamber container in order to compress the coffee powder located therein. After compression of the coffee powder, the further tamper is removed from the brewing chamber container, and the coffee powder compressed in the brewing chamber container is brewed with hot water. The coffee beverage produced in this way flows out of the brewing chamber container through a coffee outlet and can be poured into a cup in portions. After completion of the brewing process, the tamper located in the outlet opening can be removed from the brewing chamber container in order to remove the used coffee powder from the brewing chamber container, wherein, in order to eject the wet coffee powder cake, the further tamper can again be inserted from above through the filling opening of the brewing chamber container in order to push the used coffee filter cake out of the brewing chamber container through the outlet opening.

In order to prevent the feeding element of the feeding apparatus from interfering with the compression of the introduced coffee powder, it is expedient if the brewing chamber container and the feeding element are pivotable relative to one another. For example, the feeding element can be pivotably mounted above the brewing chamber container. As a result, the feeding element can be pivoted away from the brewing chamber container after the coffee powder has been completely introduced into the brewing chamber container, so that the second tamper can be inserted from above into the filling opening of the brewing chamber container without any impediment in order to compress the coffee powder. In this case, it is also possible to mount the brewing chamber container pivotably relative to the then stationary feeding element. In this case, it is preferred to transfer the pivoting movement of the brewing chamber container from the shaking apparatus to the brewing chamber container. As a result, the pivoting movement of the brewing chamber container can be triggered by the shaking apparatus.

The brewing chamber container can also be a portafilter container of a portafilter machine, which portafilter container is used, for example, in semi-automatic espresso machines. Such portafilter containers have a pot-shaped or cup-shaped container for receiving and brewing coffee powder and an upper filling opening for introducing the coffee powder and at least one discharge opening from which the brewed espresso can flow out of the portafilter container.

The shaking apparatus of the device according to the invention expediently has an electrically driven motor, in particular an eccentric or an unbalance motor. The electrically driven motor of the shaking apparatus, which, when in the form of an unbalance motor for example, drives an unbalanced mass, can be integrated into the coffee machine and driven electrically in a simple manner, since an electrical supply is present anyway in a fully or semi-automatic coffee machine, for example for the pumps for supplying the brewing water and for an electric heater for heating the brewing water. In an expedient embodiment, the shaking apparatus can also have an alternating and rotationally reciprocating shaft which is connected in the radial direction of the shaft to the brewing chamber container in order to transfer the rotational movements of the shaking apparatus to the brewing chamber container.

The brewing chamber container is expediently coupled to the shaking apparatus in such a way that the shaking movements of the shaking apparatus are transferred to the brewing chamber container in two directions orthogonal to one another. For example, in the case of a cylindrical embodiment of the brewing chamber container, the brewing chamber container can move in the radial or axial direction. In this case, it is also possible to generate a superimposed shaking movement both in the radial direction and in the axial direction. Transfer of the vibration transferred from the shaking apparatus to the brewing chamber container both in the radial and in the axial direction improves on the one hand the homogeneous distribution of the coffee powder introduced into the brewing chamber container and ensures on the other hand a pre-compression, which, in conjunction with the tamper inserted into the filling opening of the brewing chamber container for compressing the coffee powder, enables a homogeneous density distribution of the coffee powder compressed in the brewing chamber container.

In order to control the vibrational movements which are transferred from the shaking apparatus to the brewing chamber container, the shaking apparatus is expediently coupled to a control unit of the coffee machine. The shaking apparatus can be controlled by the control unit in such a way that it causes the brewing chamber container to vibrate while the feeding apparatus conducts coffee powder into the brewing chamber container. It is also possible for the control unit to put the shaking apparatus into operation after completion of the filling process so that the coffee powder conducted into the brewing chamber container by the feeding apparatus is evened out in the brewing chamber container by the vibrations transferred from the shaking apparatus to the brewing chamber container after completion of the filling process.

The amplitude and/or the frequency of the shaking movement transferred from the shaking apparatus to the brewing chamber container can preferably be adjusted. This adjustment expediently takes place via the control unit of the coffee machine, wherein an operator can specify desired settings for the amplitude and/or the frequency of the shaking movement of the shaking apparatus at an operator interface. This makes it possible to adapt the even distribution and compression of the coffee powder in the brewing chamber container to different compositions and parameters of the coffee powder, for example to the grinding degree of the coffee powder or the degree of roasting of the coffee beans from which the coffee powder has been produced by grinding.

Figure 2:
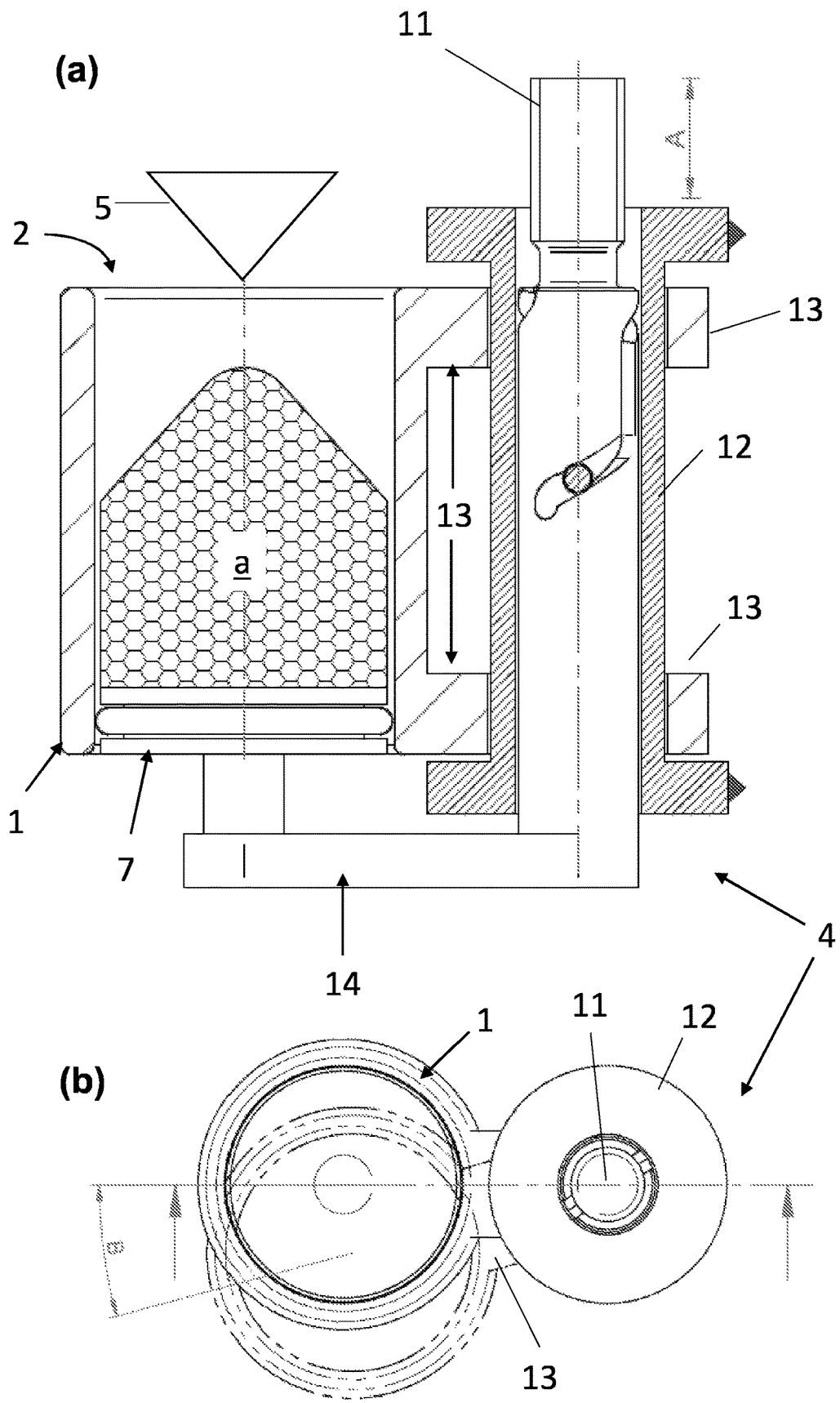

These and other advantages and features of the invention will be apparent from the exemplary embodiment described in more detail below with reference to the accompanying drawings. In the drawings:

FIG. 1: shows a schematic diagram of a device according to the invention for feeding coffee powder into a brewing chamber of a coffee machine, the device being shown in FIG. 1a during introduction of the coffee powder into a brewing chamber container of the brewing chamber, FIG. 1b showing the brewing chamber container coupled to a shaking apparatus during the introduction of the coffee powder, and FIG. 1c showing the brewing chamber container during compression of the introduced coffee powder with a tamper insertable into the brewing chamber container;

FIG. 2: shows a diagram of an exemplary embodiment for coupling a shaking apparatus to the brewing chamber container of a device according to the invention, FIG. 2a showing the device in a side view, and FIG. 2b showing the device in view from above.

FIG. 1 shows a device according to the invention for feeding coffee powder into a brewing chamber of a coffee machine. The brewing chamber can be a brewing chamber integrated into a coffee machine, for example a fully automatic coffee machine. However, the brewing chamber can also be designed as a portafilter of a portafilter machine for the production of espresso.

The exemplary embodiment shown in FIG. 1 is a brewing chamber which is integrated or can be integrated into a fully automatic coffee machine and has a brewing chamber container 1 in the form of a tube section with an upper filling opening 2 and an outlet opening 6 opposite thereto. Inserted into the outlet opening 6 is a movable tamper 7 which, in its inserted position shown in FIG. 1, forms a bottom of the brewing chamber container 1. Seals 9 are provided for sealing the bottom relative to the tubular wall of the brewing chamber container 1. A feeding element 5 of a feeding apparatus 3 for feeding the coffee powder a is arranged above the filling opening 2. The feeding element 5 can be a funnel, as indicated in FIG. 1a. The feeding element can also be designed as a filling tube or filling hose. The feeding apparatus 3 is connected via a connecting line 10 to a grinding apparatus not shown here. The grinding apparatus can be a mill integrated into the coffee machine for grinding coffee beans. The coffee powder produced by the grinding apparatus is conducted through the feed line 10 and the feeding element 5 through the filling opening 2 into the brewing chamber container 1, the coffee powder a trickling out of the feeding element 5 and into the brewing chamber container 1 due to gravity. In the process, a heap of coffee powder a is formed as indicated in FIG. 1a.

In order to prevent the coffee powder a introduced into the brewing chamber container 1 from accumulating in the form of a coffee powder heap, a shaking apparatus 4 is mechanically coupled to the brewing chamber container 1 in the device according to the invention. The shaking apparatus can be, for example, an electrically driven eccentric or an electric unbalance motor, which drives an unbalanced mass in the motor. The shaking apparatus 4 generates shaking movements with a predetermined amplitude A and a predetermined frequency f. These shaking movements are transferred to the brewing chamber container 1 by the mechanical coupling of the shaking apparatus the shaking apparatus 4, which is indicated in FIG. 1b by the arrow shown between the shaking apparatus 4 and the brewing chamber container 1. Owing to the transfer of the shaking movements of the shaking apparatus 4 to the brewing chamber container 1, the brewing chamber container 1 also executes vibrations at the predetermined amplitude A and the predetermined frequency f.

In expedient exemplary embodiments, the shaking movement can be transferred to the brewing chamber container either in the radial direction of the brewing chamber container 1 or else in the axial direction of the brewing chamber container 1. The shaking movements of the shaking apparatus 4 are particularly preferably transferred to the brewing chamber container 1 in two mutually orthogonal directions, that is to say for example in the radial and axial direction of the cylindrical brewing chamber container 1.

In order to control the shaking movements transferred from the shaking apparatus 4 to the brewing chamber container 1, the electrically driven motor of the shaking apparatus 4 is coupled to a control unit. In this case, the control unit can expediently be the central control unit of the coffee machine. The amplitude and the frequency of the shaking movements are controlled via this control unit. The control unit preferably comprises an operator interface via which an operator of the coffee machine can input the desired amplitude A and the desired frequency f of the shaking movements or select them from a series of predetermined values. The control unit controls the shaking apparatus 4 in accordance with the input values for the amplitude A and the frequency f.

The control unit is expediently configured in such a way that the shaking apparatus 4 is put into operation during the introduction of coffee powder a into the brewing chamber container 1 by means of the feeding apparatus 3 and is switched off after completion of the filling process. However, it is also possible for the shaking apparatus 4 to be put into operation only after the completion of the filling process in order to cause the brewing chamber container 1 coupled to the shaking apparatus 4 to vibrate. Due to the vibrations transferred to the brewing chamber container 1, the coffee powder a is evenly distributed in the brewing chamber container 1 either already during the filling process and/or after the filling process, resulting in a flat, horizontal leveling of the coffee powder a in the brewing chamber container 1, as shown in FIG. 1b.

After the introduction and the evening out of the introduced amount of the coffee powder a into the brewing chamber container 1, a second tamper 8 is pressed from above through the filling opening 2 into the brewing chamber container 1 in order to compress the introduced amount of coffee powder a. In order that the feeding apparatus 3 does not impede the insertion movement of the second tamper 8 into the brewing chamber container 1, the feeding apparatus 3 is pivotable so that the feeding apparatus 3 can be pivoted away from the filling opening 2 when the second tamper 8 is inserted into the brewing chamber container 1.

A feed line, not shown here, for feeding hot water is arranged in the second tamper 8. After the coffee powder a has been compressed, hot water is conducted into the brewing chamber container 1 via this feed line in order to brew the introduced coffee powder a. The coffee beverage produced thereby can flow out of the brewing chamber container 1 through a coffee outlet, also not shown here, and be poured into a cup.

After completion of the brewing process and removal of the coffee beverage produced thereby, the lower, first tamper 7 is moved out of the brewing chamber container 1, and the wet coffee powder cake of the used coffee powder located in the brewing chamber container 1 can be pressed downward out of the outlet opening 6 by a further movement of the upper, second tamper 8 in order to clear the brewing chamber for the next brewing process for producing a coffee beverage.

Thereafter, the bottom of the brewing chamber container 1 is closed again by inserting the (lower) first tamper 7 into the outlet opening 6 of the brewing chamber container 1 so that a predetermined amount of coffee powder can be metered into the brewing chamber container 1 again and evenly compressed in the manner described above for the next brewing process.

In order to ensure that the entire amount of coffee powder provided by the grinding apparatus can be conducted without loss via the feeding apparatus 3 into the brewing chamber container 1, the feeding element 5 is preferably mechanically decoupled from the brewing chamber container 1. This ensures that, during operation of the shaking apparatus 4, the vibrations are only transferred to the brewing chamber container 1 but not to the feeding element 5 or the feeding apparatus 3.

The shaking movements transferred by the shaking apparatus 4 during and/or after the introduction of the coffee powder a into the brewing chamber container 1 lead to an even distribution of the introduced amount of the coffee powder a in the brewing chamber container 1 and ensure a largely flat, horizontal surface of the introduced amount of coffee powder. As a result, when the introduced coffee powder a is subsequently compressed by the upper, second tamper 8, an even and homogeneous compression of the coffee powder a in the brewing chamber container 1 can be ensured. The introduced and compressed coffee powder has a homogeneous density distribution over the entire volume of the introduced coffee powder. The most homogeneous distribution possible and the most even density possible of the introduced amount of coffee powder has a positive influence on the quality of the coffee beverage produced since the largest possible effective brewing volume can be utilized when brewing the coffee powder distributed evenly in the brewing chamber container 1.

The desired homogeneous distribution of the coffee powder in the brewing chamber container 1 can be adapted to the properties of the coffee powder used, such as its grinding or roasting degree, by the preferably enabled adjustment of the amplitude and/or the frequency of the shaking movements which are transferred from the shaking apparatus 4 to the brewing chamber container 1. The properties of the coffee powder likewise have a considerable influence on the quality and the taste of the coffee beverage produced, which can still be optimized using a device according to the invention.

FIG. 2 shows an exemplary embodiment for coupling a shaking apparatus 4 to a brewing chamber container 1. The shaking apparatus 4 comprises a shaft 11 which is rotatably mounted in a sleeve-shaped bearing housing 12 and is coupled to a motor not shown here. The shaft 11 can be caused to rotate via the motor and/or displaced axially in the bearing housing 12. In particular, the motor can transfer alternating rotational movements, that is to say reciprocating movements, for generating shaking movements, to the shaft 11. At the lower end of the shaft 11 there is a connecting part 14 which connects the shaft 11 to the lower tamper 7. In the position shown in FIG. 2a, the lower tamper 7 is inserted into the outlet opening 6 in order to form a bottom of the brewing chamber container 1. Radially projecting flanges 13 are arranged on the outer circumference of the brewing chamber container 1 and surround the bearing housing 12 and are mounted in a rotationally movable manner on the outer circumference of the bearing housing 12.

The shaft 11 can expediently be both rotated and displaced upward and downward in the axial direction in the stationary bearing housing 12. The motor coupled to the shaft 11 is preferably actuated by a control unit in such a way that it can trigger both periodic rotational movements in the form of reciprocating movements and axial displacements of the shaft 11 relative to the bearing bushing 12.

In the case of a transfer of reciprocating rotational movements of the shaft 11 relative to the stationary bearing bushing 12, the rotational movements of the shaft 11 are transferred as vibrational movements to the brewing chamber container 1 via the connecting part 14. The brewing chamber container 1 is caused to vibrate thereby. An axial movement of the shaft 11 in the bearing bushing 12 is also transferred to the brewing chamber container 1 via the connecting part 14. When the shaft 11 is alternately periodically moved upward and downward in the axial direction, this movement of the shaft 11 is transferred to the brewing chamber container 1 as an axial vibrational movement.

FIG. 2b shows the periodic rotational movements that can be transferred from the shaking apparatus 4 to the brewing chamber container 1 within a rotational angle R.

In the embodiment of a device according to the invention shown in FIG. 2, the coupling of the lower tamper 7 via the connecting part 14 to the shaft 11 can also be used to move the lower tamper 7 into the outlet opening 6 and out of the outlet opening 6. In order to move the lower tamper 7 out of the outlet opening 6 of the brewing chamber container 1, the shaft 11 can be displaced downward in the bearing bushing 12 in the axial direction. In order to move the tamper 7 moved out of the outlet opening 6 and away from the outlet opening 6, the shaft 11 can then be rotated by a predetermined angle. In this case, the rotational angle is expediently adjusted to be large enough for the removed tamper 7 to be pivoted completely away from the outlet opening 6. By pivoting away the lower tamper 7, the coffee powder cake of used coffee powder a located in the brewing chamber container 1 after completion of a brewing process can be ejected from the brewing chamber container 1 without any impediment by means of the upper tamper 8.

The invention claimed is:

1. A device for feeding coffee powder into a brewing chamber of a coffee machine, the device comprising:
    a brewing chamber container comprising a filling opening for receiving coffee powder to be brewed in the brewing chamber container;
    a feeding apparatus for feeding the coffee powder through the filling opening into the brewing chamber container; and
    a shaking apparatus coupled to the brewing chamber container in order to cause the brewing chamber container to vibrate during and/or after the coffee powder has been fed into the brewing chamber container, wherein the shaking apparatus comprises an alternating and rotationally reciprocating shaft that is connected to the brewing chamber container in order to transfer the movements of the shaft to the brewing chamber container.

2. The device according to claim 1, wherein the feeding apparatus comprises a feeding element in the form of a funnel or a filling tube via which the coffee powder can be introduced into the brewing chamber container through the filling opening, and wherein the feeding element is decoupled from the brewing chamber container.

3. The device according to claim 1, wherein the brewing chamber container is cylindrical and wherein the shaking apparatus causes the brewing chamber container to vibrate in an axial direction or in a radial direction during the introduction of the coffee powder.

4. The device according to claim 1, wherein the brewing chamber container is cylindrical and wherein the shaking apparatus causes the brewing chamber container to vibrate both in an axial direction and in a radial direction during the introduction of the coffee powder.

5. The device according claim 1, wherein the shaking apparatus is coupled to and controlled by a control unit, such that the shaking apparatus causes the brewing chamber container to vibrate during at least one of (a) while the feeding apparatus conducts the coffee powder into the brewing chamber container or (b) after the coffee powder has been fed into the brewing chamber container.

6. The device according to claim 5, wherein at least one of the amplitude or the frequency of a shaking movement transferred by the shaking apparatus to the brewing chamber container can be adjusted via the control unit.

7. The device according to claim 1, wherein the brewing chamber container comprises an outlet opening which is generally opposite the filling opening and through which a quantity of used coffee powder can be ejected after brewing of the coffee powder.

8. The device according to claim 7, wherein a movable first tamper is sized and shaped to be inserted into and removed from the outlet opening, and wherein, in an inserted position, the first tamper forms a bottom of the brewing chamber container.

9. The device according to claim 1, wherein a movable second tamper is sized and shaped to be inserted into the filling opening, and wherein the second tamper is coupled to a control unit which presses the second tamper into the filling opening after a predetermined amount of the coffee powder has been introduced into the brewing chamber container, in order to compress the introduced coffee powder by means of the second tamper.

10. The device according to claim 1, wherein the brewing chamber container comprises a coffee outlet through which coffee produced in the brewing chamber container by brewing the coffee powder with hot water can flow out of the brewing chamber.

11. The device according to claim 1, wherein the feeding apparatus is coupled to a grinding apparatus, and wherein the grinding apparatus produces the coffee powder by grinding coffee beans.

12. The device according to claim 1, wherein the shaking apparatus comprises an electrically driven motor.

13. The device according to claim 1, wherein the shaft is movable in an axial direction relative to the brewing chamber container, such that the axial movements of the shaft are transferred to the brewing chamber container.

14. The device according to claim 1, wherein the shaking apparatus causes the brewing chamber container to vibrate in two mutually orthogonal directions.

15. The device according to claim 2, wherein the feeding element of the feeding apparatus and the brewing chamber container can be pivoted relative to one another.

16. The device according to claim 2, wherein the brewing chamber container can be pivoted relative to the stationary feeding element, and wherein a pivoting movement of the brewing chamber container is triggered by the shaking apparatus.

17. The device according to claim 1, wherein the shaking apparatus causes the brewing chamber container to vibrate both in an axial direction relative to the brewing chamber container and perpendicularly thereto.

18. A device for feeding coffee powder into a brewing chamber of a coffee machine, the device comprising:
　a brewing chamber container comprising a filling opening for receiving coffee powder to be brewed in the brewing chamber container;
　a feeding apparatus comprising a feeding element in the form of a funnel or a filling tube via which the coffee powder can be introduced through the filling opening into the brewing chamber container, wherein the brewing chamber container is pivotable relative to the feeding element; and
　a shaking apparatus coupled to the brewing chamber container in order to cause the brewing chamber container to vibrate during and/or after the coffee powder has been fed into the brewing chamber container, wherein the shaking apparatus comprises an alternating and rotationally reciprocating shaft, which is connected to the brewing chamber container in order to transfer the movements of the shaft to the brewing chamber container, and wherein the shaking apparatus causes the brewing chamber container to pivot relative to the feeding element.

19. A brewing chamber for a coffee machine, the brewing chamber comprising:
　a brewing chamber container comprising a filling opening for receiving coffee powder and an outlet opening located generally opposite the filling opening;
　a feeding apparatus for feeding the coffee powder through the filling opening into the brewing chamber container;
　a movable first tamper sized and shaped to be inserted into and removed from the outlet opening of the brewing chamber container, wherein the first tamper forms a bottom of the brewing chamber container when inserted in the brewing chamber container; and
　a shaking apparatus coupled to the brewing chamber container in order to cause the brewing chamber container to vibrate during and/or after the coffee powder has been fed into the brewing chamber,
　wherein the shaking apparatus comprises a shaft rotatably mounted in a bearing housing and coupled to a motor, a connecting part disposed between the shaft and the first tamper, and wherein the motor imparts at least one of an axial displacement or a rotation of the brewing chamber container relative to the bearing housing.

\* \* \* \* \*